United States Patent
Farsaie

(10) Patent No.: US 7,257,249 B2
(45) Date of Patent: Aug. 14, 2007

(54) DISCRETE LINEAR SPACE SAMPLING METHOD AND APPARATUS FOR GENERATING DIGITAL 3D MODELS

(75) Inventor: Ali Farsaie, Potomac, MD (US)

(73) Assignee: Spatial Integrated Systems, Inc., Rockville, MD (US)

( * ) Notice: Subject to any disclaimer, the term of this patent is extended or adjusted under 35 U.S.C. 154(b) by 646 days.

(21) Appl. No.: 10/460,707

(22) Filed: Jun. 12, 2003

(65) Prior Publication Data

US 2004/0027347 A1 Feb. 12, 2004

Related U.S. Application Data

(60) Provisional application No. 60/388,605, filed on Jun. 12, 2002.

(51) Int. Cl.
*G06K 9/00* (2006.01)
(52) U.S. Cl. .................. 382/154; 382/312; 345/419
(58) Field of Classification Search ............. 382/154, 382/181, 209, 217, 218, 312; 717/108, 106; 345/418, 419; 348/42, 46, 47
See application file for complete search history.

(56) References Cited

U.S. PATENT DOCUMENTS

| | | | |
|---|---|---|---|
| 6,081,273 A | | 6/2000 | Weng et al. |
| 6,363,269 B1 * | | 3/2002 | Hanna et al. ............. 600/322 |
| 6,476,803 B1 * | | 11/2002 | Zhang et al. ............. 345/419 |
| 7,003,136 B1 * | | 2/2006 | Harville ................. 382/103 |
| 7,046,838 B1 * | | 5/2006 | Sakagawa et al. ......... 382/154 |

FOREIGN PATENT DOCUMENTS

EP 1100048 5/2001

OTHER PUBLICATIONS

Kiyohide Satoh, Itaru Kitahara, Yuichi Ohta, "3D Image Display With Motion Parallax By Camera Matrix Stereo", Institute of Information Sciences and Electronics, University of Tsukuba, *Proceedings of Multimedia '96*, pp. 349-356.

Zitnick, et al., "A cooperative Algorithm for Stereo Matching and Occlusion- Detection," IEEE Transactions on Patter Analysis and Machine Intelligence, IEEE Inc., New York, US, vol. 22, No. 7, Jul. 2000, pp. 675-684.

(Continued)

*Primary Examiner*—Sheela Chawan
(74) *Attorney, Agent, or Firm*—Fay Sharpe LLP

(57) ABSTRACT

A discrete linear space sampling method and system for generating digital 3D models comprising. A plurality of digital images are acquired of a subject from a respective plurality of image sensor positions near the image sensor location. Candidate 3d-spels are identified, each 3d-spel being an image pixel corresponding to a common point on said subject. Candidate 3d-spels are rejected based on a differential analysis of the candidate 3d-spels, the remaining 3d-spels forming a set of accepted 3d-spels. 3D coordinates are calculated for each accepted 3d-spel, thereby forming a point-cloud of the subject.

46 Claims, 14 Drawing Sheets

OTHER PUBLICATIONS

Kostkova, "Stereoscopic Matching: Problems and Solutions," Czech Technical University, Prague, Internet article, URL:ftb://cmp.felk.cvut.cz/pub/cmp/articles/kostkova/Kostkova-TR-2002-13.pdf, Nov. 4, 2003, pp. 1-29.

Zhang, et al., "Stereo matching with segmentation-based Cooperation," Computer Vision—ECCV 2002. 7th European Conference on Computer Vision. Proceedings, Part II, Copenhagen, Denmark, 28-, pp. 556-571.

Lorensen, et al., Marching Cubes: A High Resolution 3D Surface Construction Algorithm,: Siam Journal on Computing, Society for Industrial and applied Mathematics, US, vol. 21, No. 4, Jul. 1, 1987, pp. 163-169.

Huang, et al., "Motin and Structure from Feature correspondences: A Review," Proceedings of the IEEE, IEEE. New York, US, vol. 82, No. 2, Feb. 1, 1994, pp. 252-268.

* cited by examiner

DISCRETE LINEAR SPACE SAMPLING METHOD AND APPARATUS FOR GENERATING DIGITAL 3D MODELS

This application claims the benefit of U.S. Provisional Application No. 60/388,605, filed Jun. 12, 2002, incorporated herein by reference in its entirety.

BACKGROUND OF THE INVENTION

This invention relates in general to imaging and, more particularly, to a method and apparatus of using a moving camera or fixed sensor array for 3-dimensional scanning of an object.

In many computer applications, it is desirable to have the ability to generate a file describing a three dimensional object. For example, in order to reverse engineer a mechanical part for which drawings are no longer available, it is desirable to be able to efficiently and accurately generate a digital file describing the part. One method is to scan the part with a 3D scanner such as a laser scanning device, generating a digital model therefrom. The models can then be manipulated using computer aided-design/computer aided manufacturing (CAD/CAM) processing techniques to reproduce the desired part. 3D scanners are used in a variety of fields including medical imaging, topography, computer aided-design/computer aided manufacturing (CAD/CAM), architecture, reverse engineering and computer animation/virtual reality.

Early 3D scanners used mechanical probes moving across an object's surface. A mechanical arm connected to the probe moves in accordance with the contours of the surface, and the arm movements are translated into information describing the location of the probe at multiple points. These early digital systems are slow, since they must touch each position on the object at which a measurement reading is taken, and are not suitable for scanning soft objects such as clay. Further, they are not suitable for modeling large 3D spaces or scenes, such as the interior of a room or building.

More recently, optical 3D scanners have become available. 3D scanners of this type project a laser pattern on an object and determine the location of points on the object using triangulation techniques. These systems can be extremely complicated and, therefore, costly. Further, laser systems are limited to a monochromatic light source, limiting their usefulness. Still further, some materials may be opaque or transparent at the frequency of the laser, further limiting their usefulness.

SUMMARY OF THE INVENTION

It is the principle objective of the present invention to provide an object and space sampling method and apparatus that overcomes the above-described limitations.

Another object of the present invention is to provide an accurate object modeling method and apparatus that is multi-spectrum, able to provide models of night scenes and able to provide color models.

It is another object of the present invention is to provide an accurate object modeling method and apparatus requiring a minimum of human intervention and setup.

In accordance with one aspect of the present invention, a discrete linear space sampling method for generating digital 3D models is provided. The method comprises acquiring a plurality of digital images of a subject from a respective plurality of image sensor positions near to an image sensor location, identifying candidate 3d-spels, wherein each 3d-spel is an image pixel corresponding to a common point on the subject, rejecting candidate 3d-spels based on a differential analysis of the candidate 3d-spels, wherein the remaining 3d-spels form a set of accepted 3d-spels, and calculating 3D coordinates for each accepted 3d-spel. The resulting 3D coordinates form a point-cloud of the subject.

In accordance with another aspect of the present invention, a system for generating digital 3D models is provided. The system comprises a means for acquiring a plurality of digital images of a subject from a plurality of image sensor positions near the image sensor location, a means for identifying candidate 3d-spels, a means for rejecting candidate 3d-spels based on a differential analysis of the candidate 3d-spels, a means for calculating 3D coordinates for each remaining 3d-spel, thereby forming a point-cloud of the subject.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein.

DETAILED DESCRIPTION OF THE PREFERRED EMBODIMENT

It will become evident from the following discussion that embodiments of the present application set forth herein, are suited for use in a wide variety object modeling systems, and are not necessarily limited in application to the particular systems illustrated.

Figure 1:
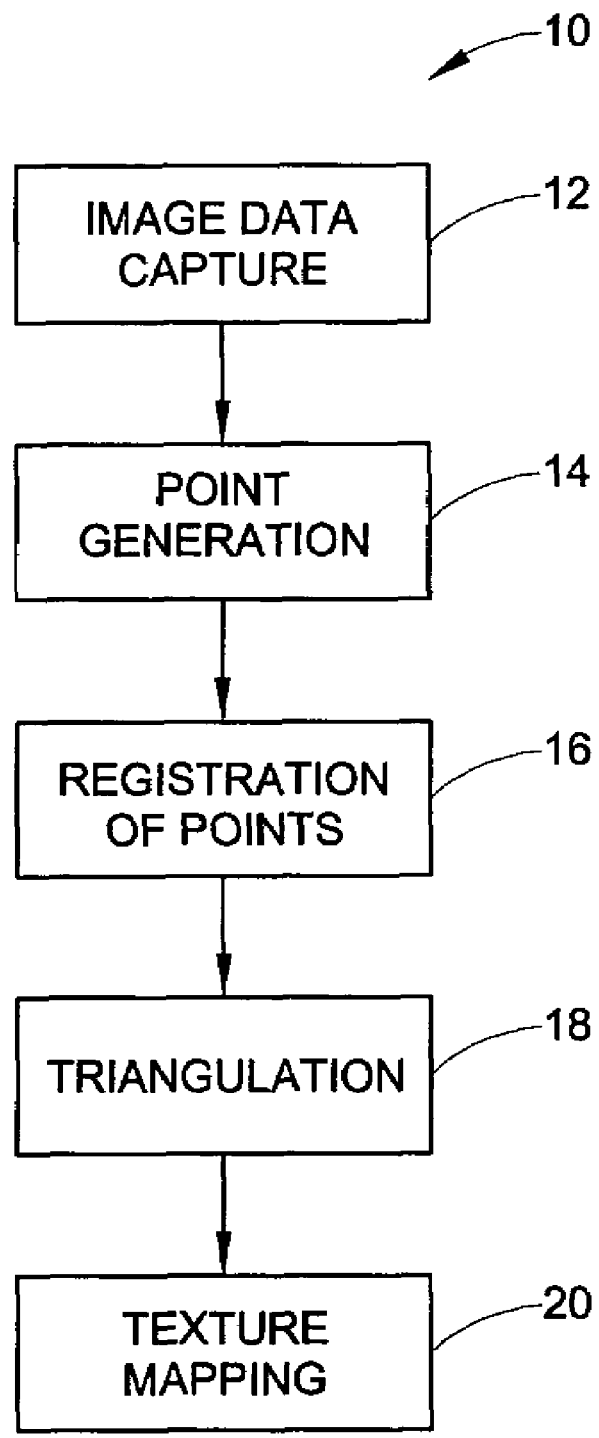
FIG. 1 is a flowchart illustrating a preferred method of 3D modeling in accordance with aspects of the present invention.

With reference to the drawings, where the showings are for the purpose of illustrating exemplary embodiments of the invention and not for the purpose of limiting same, one goal of a Discrete Linear Space Sampling (DLSS) technique in accordance with aspects of the present invention is to build a spatially accurate, photo-realistic model of a 3D space. With reference to FIG. 1, an exemplary process 10 is used to build the photo-realistic models. As shown, the process 10 has several distinguishable steps as follows:

1. Data acquisition

Suitable object or scene data is acquired (12) by using image sensors to collect digital images of the object or scene.

2. Generation of 3D points 3. 3D coordinates are generated (14) from digital images by means of the DLSS system and process. For example, DLSS system and process generates a stereo-vision zone by analyzing data from a sensor traveling along a horizontal base.

3. Registration of the 3D points

The DLSS system registers points and automatically filters noisy or superfluous data (16) optionally with no input from the user.

4. Triangulation

The DLSS system automatically builds a triangular mesh (18) from the data it collects.

5. Texture generation

The DLSS system automatically pastes texture (20) from the collected digital images onto the 3D triangular mesh model, thereby producing a photo-realistic 3D model of the object or scene.

In the following description, a detailed discussion is given of an exemplary DLSS system and process. For clarity and completeness, the description is divided into several subsections as follows:

1. DLSS Theory provides the mathematical foundation for DLSS.

2. Digital Data Capture describes how digital image sensors are used to capture the scene or object being modeled.

3. Generating 3d-spels describes how the digital images are used as input so that a cloud of three-dimensional points can be generated. In DLSS terminology, these points are called 3d-spels (three dimensional spatial elements). These 3d-spels form a point cloud model of the object or space being modeled.

4. Point Registration describes how the 3d-spels from two or more image sensor locations are correlated and registered.

5. Triangulation and Mesh Generation describes how, after the 3d-spels have been generated, a triangle mesh of the object or space is generated. It is shown how the 3d-spels are used as vertices of triangles that form a triangle mesh of the object or scene being modeled.

6. Texture Mapping describes how the texture from the original set of images is identified and "pasted" onto the triangles in the triangle mesh. In this last step of 3D model building, the process starts with the mesh and ends with a photo-realistic, spatially accurate model of the 3D object or scene.

1. DLSS Theory

In this section, a discussion of some mathematical techniques that are used in the creation of a 3D model by DLSS is presented. Essentially this section describes how:

1. 3D spatial coordinates are calculated using digital images;

2. sets of 3d-spels are registered and displayed with respect to a common origin;

3. the 3d-spels are arranged to form a triangle mesh of the space; and 4. texture obtained from the original images is pasted onto the triangle mesh.

Parallax, as used herein, is the change in the apparent position of an object due to a shift in the position of an observer. Parallax has been widely used to find the distances to stars and to find large distances on earth that are too difficult to measure directly.

Figure 2:
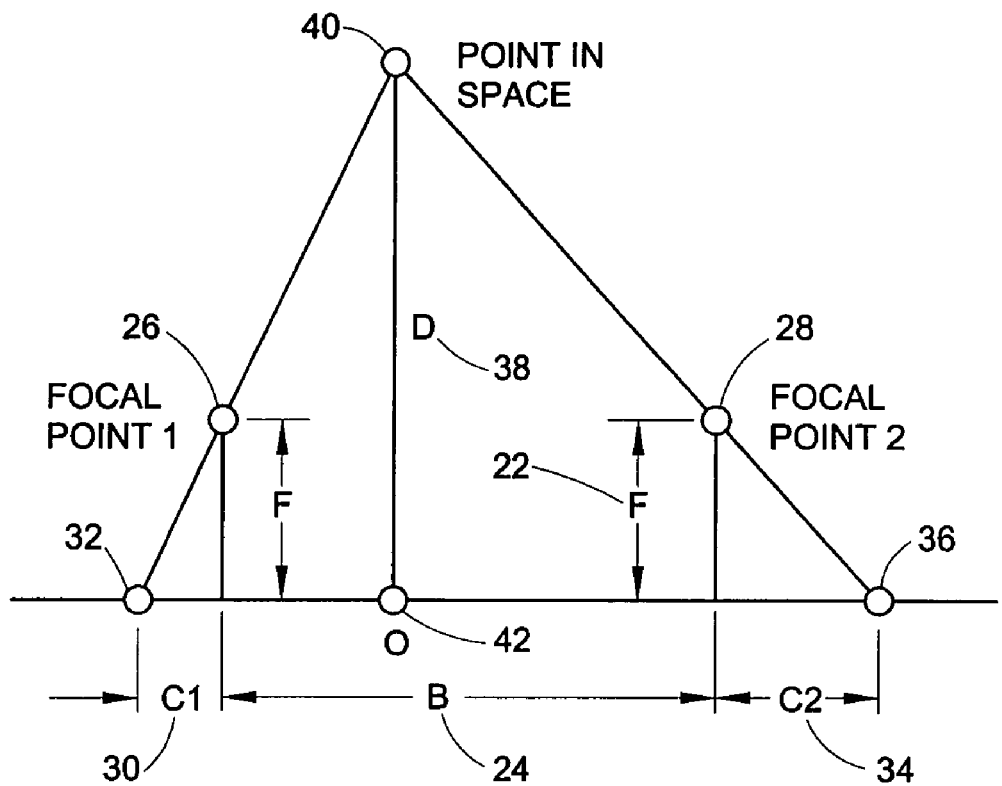
FIG. 2 is a diagram illustrating parallax from two observer locations.

In DLSS terminology, the "object" is a point in space. The two positions of the observer are simply two image sensor positions a known distance apart. For example, the image sensor optionally comprises a digital camera including a CCD, lens, etc. as is known in the art. Alternately the image sensor comprises a fixed linear array of sensors. While the various embodiments of the present invention are discussed with respect to movable cameras, it is to be appreciated that fixed arrays of sensors are also suitably adapted to, and included in the scope of, the present invention. This arrangement is shown in FIG. 2. Here, F (22) is the focal length of the lens and B (24) is the distance between the centers of the two image sensors at the two image sensor positions. The actual focal points of the image sensor lenses are labeled Focal Point 1 (26) and Focal Point 2 (28), respectively. C1 (30) is the x-distance from the center of the image sensor 1 to the pixel 32 where the point is detected. C2 (34) is defined similarly for image sensor 2 with respect to its corresponding detected pixel 36. In DLSS, C1 (30) and C2 (34) are obtained by multiplying the pixel width times the number or pixels the image point is offset from the center of the CCD of the respective image sensor. D (38) is the distance (z coordinate) to the point (40) in space.

Using similar triangles, it is seen that $$D/F=(B+C1+C2)/(C1+C2)$$

and, if P is defined as P=(C1+C2), then $$D/F=(B+P)/P.$$

Rearranging the terms yields $$D=F*(B+P)/P.$$  Equation 1.1.1

Note that D is actually the z coordinate of the point in space with respect to an origin 42 located at O in FIG. 2. Thus equation 1 may be written as $$z=F*(B+P)/P.$$  Equation 1.1.1a Similarly, expressions can be found for the x and y coordinates of the point in space. Let Yoffset denote the actual distance the image of the point is offset from the center of either image sensor. Then $$x=z*C1/F$$  Equation 1.1.2

$$y=z*Yoffset/F.$$  Equation 1.1.3

From the discussion above, it is clear that, if it is ensured that the same point from the two image sensor positions has been located, the point's spatial coordinates can be reliably computed, and hence a 3d-spel. Several methods according to the present invention of insuring that such a point has been located are described herein.

It is often advantageous to use more than one image sensor, or more than one image sensor location, to accurately model an object or scene. In DLSS, the different image sensor locations are preferably obtained in either one of two ways:

1. (Case A) Applying known transformations to the image sensor position. A transformation, as used herein, means one image sensor location is obtained from another by a known translation and/or a known rotation; or,
2. (Case B) Applying unknown transformations to the image sensor position.

The 3d-spels generated from different image sensor locations should have accurate 3D coordinates, but these coordinates are with respect to different origins. Sets of 3d-spels are, therefore, combined into a single set with a common origin. If the 3d-spels are generated as in Case A above, 3d-spels are transformed to a common coordinate system by applying the inverse transformation. For Case B above, 3d-spels are registered to a common origin by the use of Euler angles.

For Case A, Linear Transformations (LT) are used to map one vector space into another. Linear transformations satisfy two properties:

1) $T(a+b)=T(a)+T(b)$ for all vectors a and b
2) $T(\alpha\ b)=\alpha\ T(b)$ for any scalar $\alpha$ and any vector b.

There is a theorem from Linear Algebra that a LT from one finite dimensional vector to another has a matrix representation. Thus if T is a LT from a vector space (X for example) with dimension m to another vector space (Y for example) of dimension n, then there is a matrix A of size m×n such that $T(a)=Aa$.

It is also well known that the transformation represented by the matrix A is invertible if and only if A is invertible. Furthermore, the matrix representation of the inverse of T is given by $A^{-1}$.

An affine transformation is one of the three basic operations of rotation, scaling, and translation. If these operations are viewed as mapping 3-space (3 dimensional space) to 3-space, there is no known matrix representation for translation since it fails the second property of LTs.

To remedy this, homogeneous coordinates are used. To form these coordinates, a point (x,y,z) in 3-space is identified with the point (x,y,z,1) in 4-space. By using these coordinates, it is possible to find a matrix representation of a LT that operates on 4-space but effectively translates points in 3-space. Furthermore, it is known that any affine transformation is invertible, hence the associated matrix is also invertible.

In the current context, it is not necessary to scale points, only to translate them or rotate them. The 4×4 matrix TR that translates points by Tx, Ty, and Tz in the x, y, and z directions respectively is given by $$TR(Tx, Ty, Tz) = \begin{matrix} 1 & 0 & 0 & Tx \\ 0 & 1 & 0 & Ty \\ 0 & 0 & 1 & Tz \\ 0 & 0 & 0 & 1 \end{matrix}$$

The matrix Rx that rotates by an angle $\theta$ about the z-axis is given by $$Rz(\theta) = \begin{matrix} \cos(\theta) & \sin(\theta) & 0 & 0 \\ -\sin(\theta) & \cos(\theta) & 0 & 0 \\ 0 & 0 & 1 & 0 \\ 0 & 0 & 0 & 1 \end{matrix}$$

It is easy to see that the inverse matrix for TR(Tx,Ty,Tz) is given by TR(−Tx,−Ty,−Tz) and that the inverse of Rz($\theta$) is given by Rz(−$\theta$). Matrices to rotate about the x and y axes are similar to Rz. They are generally denoted by Rx and Ry.

Using homogeneous coordinates, it is known that:
1. The affine transformations have matrix representations;
2. The transformations and hence the matrices are invertible;
3. The matrix for a sequence of transformations is obtained by multiplying the individual matrices together; and
4. The inverse of the product matrix $M_1 \times M_2 \times M_3_x \ldots \times M^n = M_n^{-1} \times M_{n-1}^{-1} \ldots \times M_3^{-1} \times M_2^{-1} \times M_1^{-1}$.

In DLSS, the use of transformations and their inverses applies when one image sensor position is obtained from another by known translations and/or rotations. Suppose that image sensor position B is obtained from image sensor position A by a transformation T that is some sequence of n translations and/or rotations. Then T has the form:

$$T=T_1 \bullet T_2 \bullet T_3 \bullet \ldots \bullet T_n$$

where $\bullet$ denotes function composition.

From the above, the matrix for T is given by $$M=M_1 \times M_2 \times M_3 \times \ldots \times M_n$$

where $M_i$ is the matrix representation for $T_i$.

To register the points obtained from image sensor location B to those obtained at location A, the inverse transformation is applied to the 3d-spels from B. This means for each 3d-spel S collected at location B, the 3d-spel S can be registered to a 3d-spel S' at image sensor location A for B by $$S'=M_n^{-1} \times M_{n-1}^{-1} \ldots \times M_3^{-1} \times M_2^{-1} \times M_1^{-1}$$  Equation 1.2.1

As a simple example, suppose that image sensor location B is obtained by rotating image sensor location A by 60 degrees about the y axis and translating by 0,0, and 10 in the x, y, and z directions respectively. A point S, at B, can be registered with a point S' at A by rotating −60 degrees about the y axis and translating by −10 in the z direction. Using matrix notation, $M_1=TR(0,0,10)$ and $M_2=Rz(60)$. Consequently the matrix representation for T is $Rz(60)*TR(0,0,10)$. From the discussion above, the inverse of M1 is $TR(0,0,-1)$ and the inverse of M2 is $Rz(-60)$. Applying equation 1.2.1 yields $$S'=TR(0,0,-10)*Rz(-60)*S.$$

In some cases, it is not known know exactly how one image sensor location is obtained from another. In this case, Case B above, DLSS employs another method of registering points. This method is based on the following fact: performing one translation and 3 rotations can align any two coordinate systems.

Figure 3:
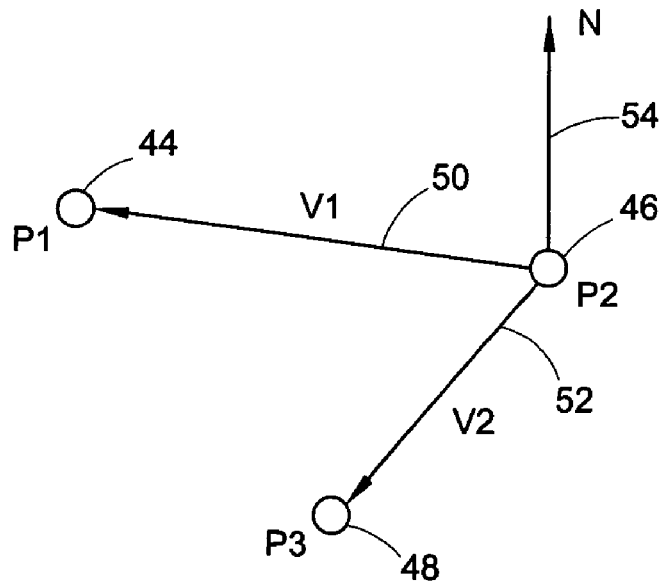
FIG. 3 shows a common set of 3 points from two image sensor locations.

In DLSS embodiments, the two coordinate systems are established by locating the same set of 3 points in two separate image sensor locations. With reference to FIG. 3, at each image sensor position, the three points 44, 46, 48 are located and given 3D coordinates as previously described.

Two vectors 50, 52, labeled V1 and V2, are formed from the 3 points 44-48 and the normal vector 54, denoted by N, to the plane as calculated by taking the cross product of V1 with V2.

$$N=V1\times V2 \qquad \text{Equation 1.2.2}$$

The direction represented by N becomes the positive y-axis for the new coordinate system. One of the vectors, V1 or V2, is selected as the direction of the positive x-axis. These vectors are perpendicular to N, but not necessarily to each other. The positive z-axis is determined by crossing N with the vector selected for the x-axis.

A normalized, mutually orthogonal set of vectors that form a basis for the new coordinate system is given by $$(V1/\|V1\|, (V1\times N)/\|V1\times N\|, N/\|N\|)$$

where $\| \|$ denotes vector norm.

Figure 4:
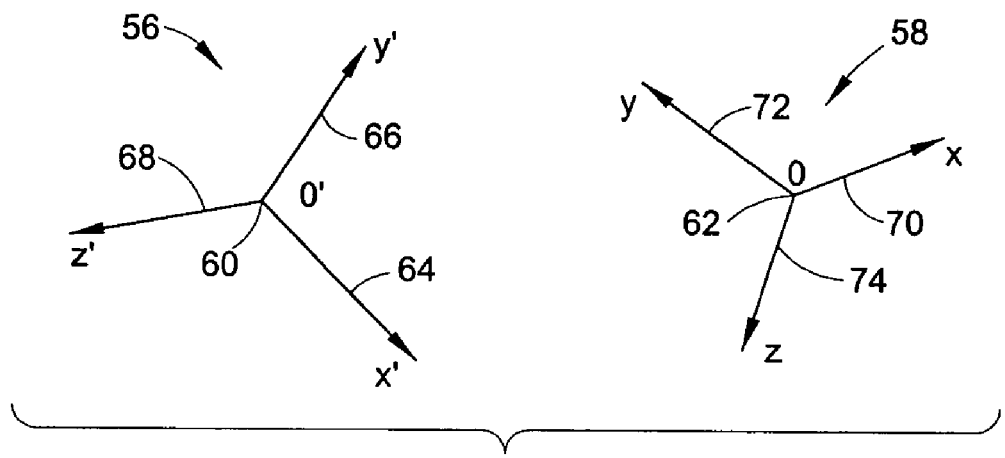
FIG. 4 shows two coordinate systems prior to a sequence of operations to align the coordinate systems.

This process is repeated at all remaining image sensor positions. After the points collected at each position are combined into one set of 3d-spels, all of the coordinate systems can then be aligned. With reference now to FIG. 4, the sequence of transformations that aligns two coordinate systems 56, 58 from two image sensor positions is the same sequence of transformations used to register the sets of 3d-spels gathered at those image sensor positions.

To align one coordinate system with another, the procedure described above prescribes that a translation be performed that shifts the origin 60, $O'=(O'x,O'y,O'z)$, to the origin 62, $O=(Ox,Oy,Oz)$. In matrix notation, this step is described by $$TR(0_x-O'_x, O_y-O'_y, O_z-O'_z) \qquad \text{Equation 1.2.3}$$

With the coordinate system 56 at the origin O' having axes labeled x' (64), y' (66) and z' (68), and the coordinate system 58 at the origin O having axes labeled x (70), y (72) and z (74), all points are rotated about the y axis so that the z' axis of the system with origin O' is rotated into the x-y plane of the system with origin O. In matrix notation, this step is described by $$Ry(\epsilon 1) \qquad \text{Equation 1.2.4}$$

where $\epsilon 1$ is the first Euler angle.

The z' and z axes are made to align by rotating points about the x-axis so that the z' axis is in the x-z plane. In matrix notation $$Rx(\epsilon 2) \qquad \text{Equation 1.2.5}$$

where $\epsilon 2$ is the second Euler angle.

A rotation is now performed about the z axis so that the x' and x axes and the y' and y axes are aligned. In matrix notation $$Rz(\epsilon 3) \qquad \text{Equation 1.2.6}$$

where $\epsilon 3$ is the third Euler angle.

When the above transformations are done on the 3d-spels with an origin at O', the 3d-spels are registered with the points having an origin at O. In practice, the method of Euler is more general than the method of inverse transformations. The latter method may be treated as a special case of the former.

In embodiments of a DLSS triangulation system, a tangent plane is established at each 3D point on the surface of the object. These tangent planes are used in triangulation and, since the texture will be pasted on the visible surface, the normal vector to each plane is assigned such that it points away from the visible surface. This prevents the texture from being pasted on the inside surface of the object being modeled.

For each point (x,y,z) on the surface, the least squares plane is constructed. This plane serves as the tangent plane. Curve fitting is done on all points in a neighborhood of the point (x,y,z). The size of the neighborhoods can vary to make the number of planes larger or smaller.

Using all points from the neighborhood, the coverage matrix, C, is created. This matrix is defined to be the sum of all of the inner products of vectors of the form (v−0) with themselves where:

a. v is in the neighborhood of (x,y,z); and b. 0 is the center of mass of the points in the neighborhood of (x,y,z).

From statistical theory it is known that C is a positive definite matrix and that an eigenvector, N, corresponding to the largest eigenvalue of C is a normal vector to the regression plane. However, it is not known which vector, N or −N, points away from the visible surface.

To determine the proper orientation of the normal vector, a minimal spanning tree is built. For a set of edges and vertices such as those collected by DLSS, a minimal spanning tree is simply a graph in which the sum of the lengths of the edges is minimal and that contains all the vertices.

During a traversal of the minimal spanning tree, a normal vector is expected to be oriented similarly to that for neighboring tangent planes. For example, a cluster of 10 planes would not generally be expected to have 9 normal vectors pointing in one direction while the 10th points in the opposite direction. Based on threshold values, a normal vector is negated based on its neighbors.

A surface-fitting algorithm, known as Marching Cubes, is implemented for visualizing the surface of a 3D object. The Marching Cubes algorithm was developed in 1987 by Lorensen and Cline. {W. E. Lorensen and H. E. Cline. Marching cubes: A high resolution 3D surface reconstruction algorithm. Computer Graphics, 21 (4):163-169, July 1987.} It uses a specified threshold value to determine the surface to render. The basic idea is based on this principle: "If a point inside the desired volume has a neighboring point outside the volume, the iso-surface must be between these points."

Figure 5:
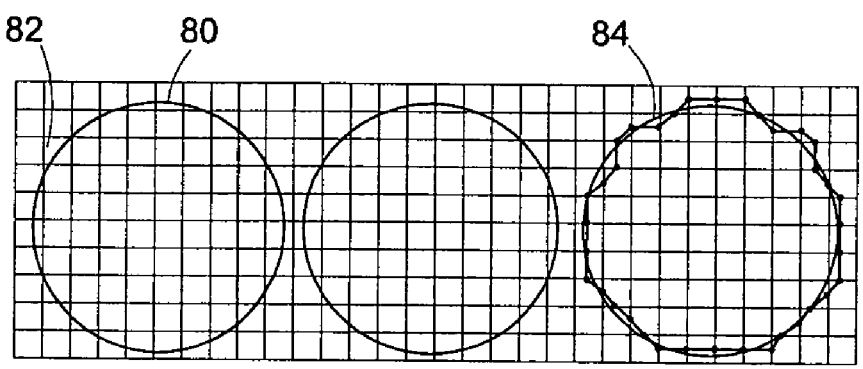
FIG. 5 illustrates a method of marching cubes suitable for practicing aspects of the present invention.

FIG. 5 illustrates the process for the two dimensional case. The figure on the left 80 is scanned to determine which rectangles 82 are intersected; in two dimensions a rectangle is a cube. If an intersection occurs, the midpoint of the edge where the intersection occurs is marked. By connecting consecutive midpoints, an approximation of the original surface is made. In the case illustrated, the approximation 84 is relatively crude, but it can be improved by increasing the resolution of rectangles.

The three-dimensional case works analogously but, as expected, it is more complicated. It has been observed that cubes rather than squares approximate the boundary of the surface. Note that it is important to know whether a point is inside or outside the surface. This is accomplished by using the signed distance previously described. Recall that the signed distance to the surface is the distance from the point to the surface with a negative sign affixed if the point is inside the surface and a positive sign affixed if the point is outside the surface.

Figure 6:
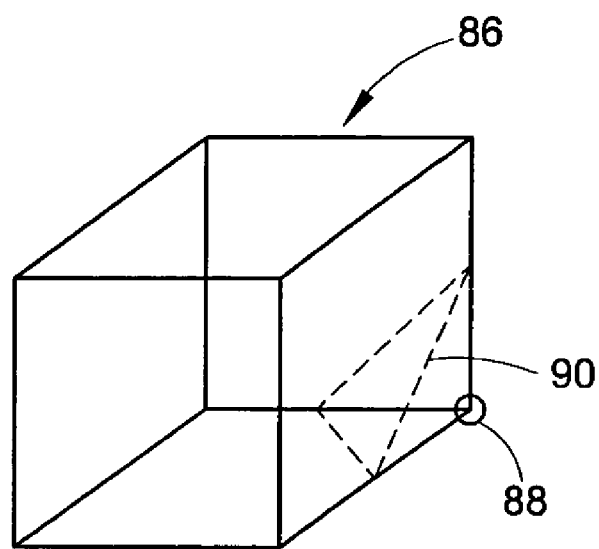
FIG. 6 shows a cube having one vertex inside the object being modeled.

With reference to FIG. 6, there are (up to isomorphism) 16 possibilities for how none, one, or more of the vertices of a cube 86 may lie inside the surface they attempt to approximate. In the simplest non-trivial case, one vertex 88 of the cube may line inside the surface. In this case, a triangle 90 is formed from the midpoints of the 3 edges that contain the vertex as shown. In this diagram, single vertex 88 indicated by the dot is found to lie inside the surface. All other vertices lie outside. A simple way to form a triangle is to use the midpoints of all edges incident on the inside vertex. This triangle 90 is indicated by the heavy dotted line. More accuracy is obtained if linear interpolation is used.

Figure 7:
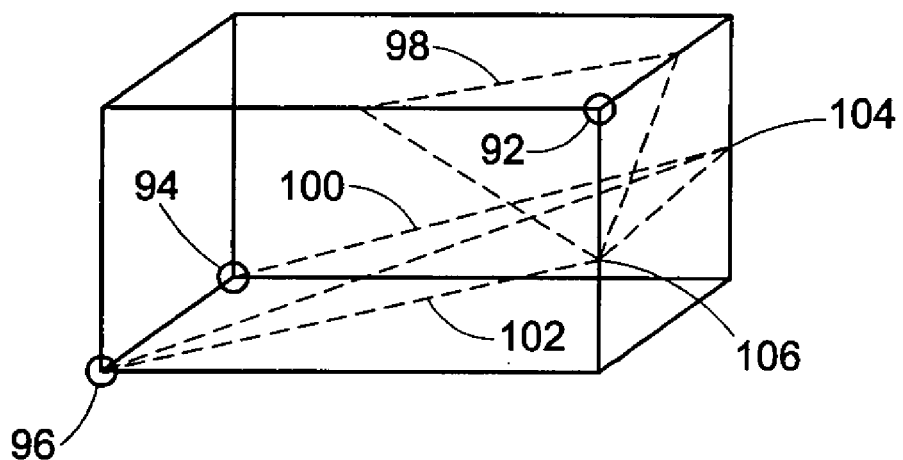
FIG. 7 shows a cube having three vertices inside the object being modeled.

Another of the 16 cases is shown in FIG. 7. In this case, 3 of the vertices 92, 94, 96 are found to lie inside the surface being modeled while the remaining 5 vertices fall outside. In this case, 3 triangles 98, 100, 102 are added to the set of vertices. The first 98 is obtained by adding the vertex that is not on the same face as the remaining two by the method described above.

Figure 8:
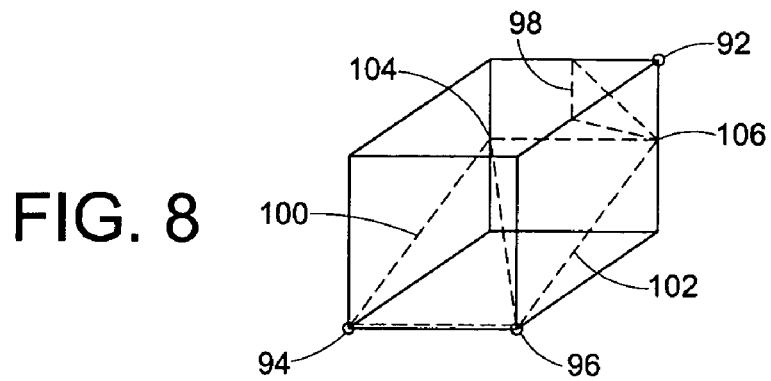
FIG. 8 is a front view of the cube in FIG. 7.

For the other two vertices, two triangles 100, 102 are added. The first added triangle 100 has, as its base, the edge between the two vertices known to lie inside the surface. The third vertex 104 is chosen as the midpoint of either of the edges on the opposite face. The second added triangle 102 is chosen with its base as the midpoints 104, 106 of the two edges on the opposite face and its vertex 96 as one of the 2 vertices known to lie in the cube. This essentially creates a plane that passes through the two vertices 94, 96 and the midpoints 104, 106 of the opposite face. A side view of the process is illustrated in FIG. 7, while FIG. 8 illustrates a front view of the same process.

Figure 9:
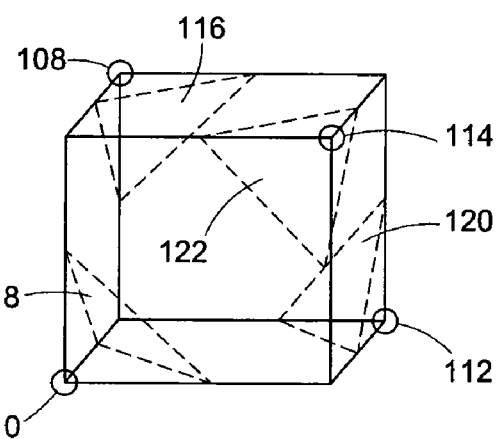
FIG. 9 shows a cube having four vertices inside the object being modeled.

With reference now to FIG. 9, another case is shown. Here, there are 4 vertices 108-112, and none on the same edge are found to lie inside the surface. In this case, each vertex is treated as if it were the only vertex lying inside the cube. Hence 4 triangles 114-120, formed by the vertices and midpoints of adjoining edges, are added to the set of triangles.

Figure 10:
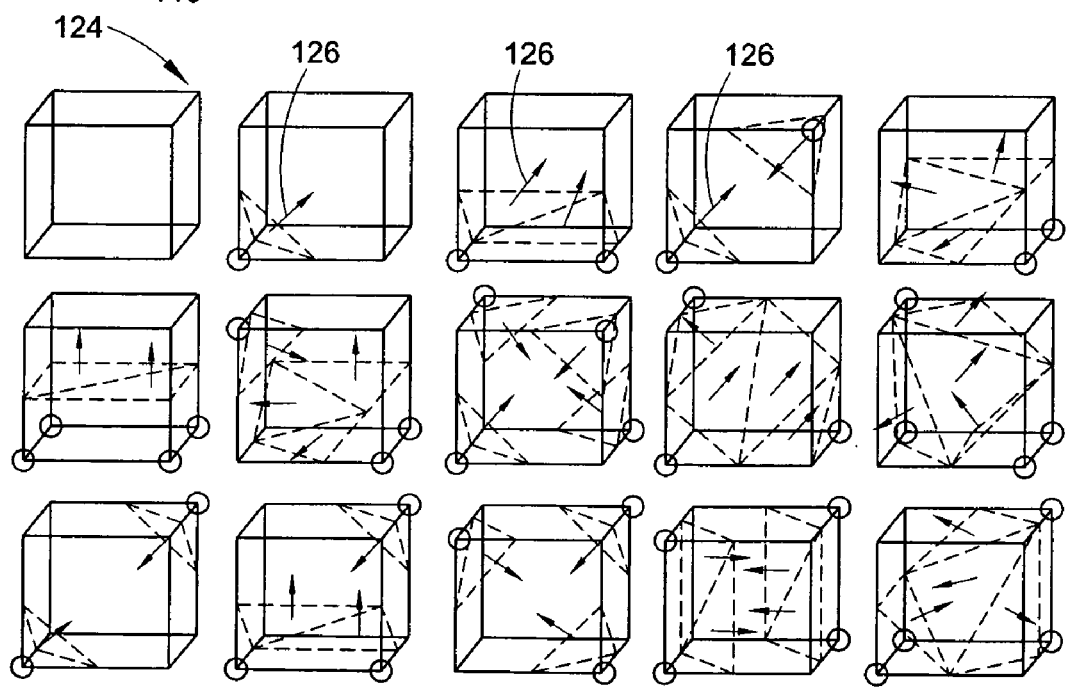
FIG. 10 shows the 15 cases of cubes according to aspects of the present invention.

With reference now to FIG. 10, and with continuing reference to FIGS. 6-9, all 15 cases 124, including the above-described cases, are shown. The vectors 126 indicate the normals to each triangle.

Texture mapping or pattern mapping is the process by which a texture or pattern in a plane is mapped to a 3D object. In DLSS embodiments, the objective is to map the texture or pattern from a subset of a 2D bitmap to the triangle that represents that subset in 3-space.

The 3D modeling process begins with pixel coordinates from a set of 2D images. These pixels are passed through a process that assigns them 3D coordinates. Furthermore, a 3d-spel is connected to the pixel coordinates from which it originated. When the triangulation process forms a triangle, it is thus possible to determine a triangular region from a bitmap that corresponds to the 3D triangle. The texture can then be transferred from the bitmap to the 3D model.

2. Digital Data Capture

The first step in a preferred embodiment of the DLSS process is digital data capture. Typically, data is captured from several image sensor positions, or several image sensors, and combined by the previously described methods.

Figure 11:
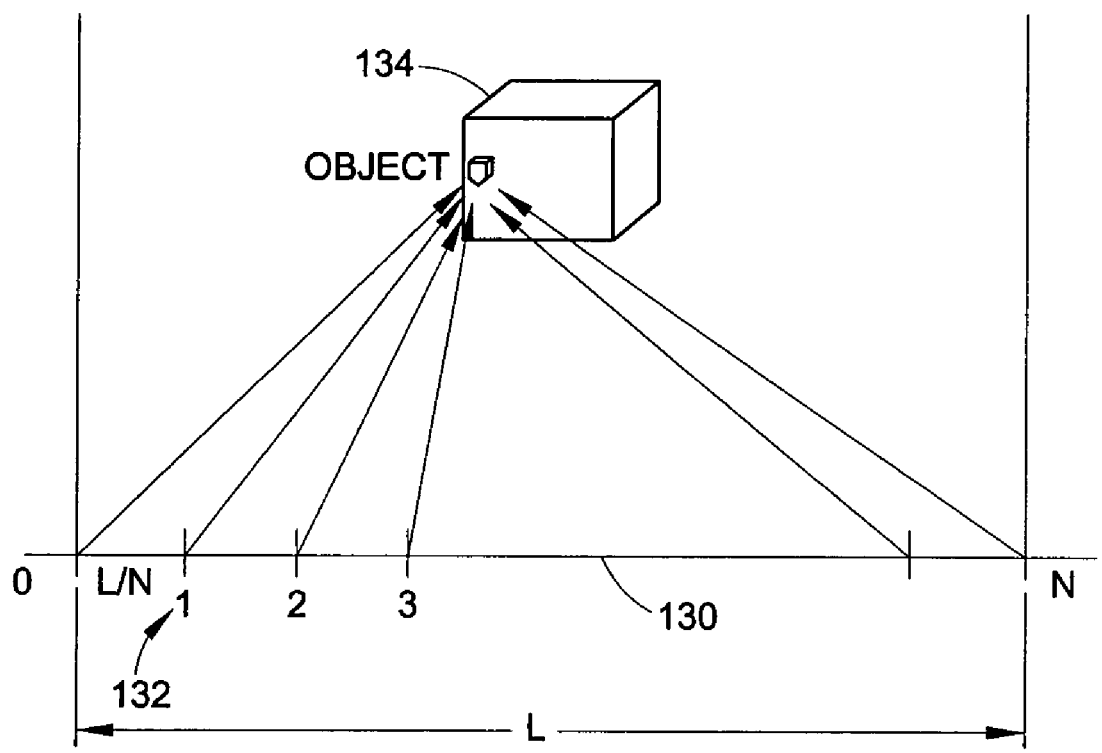
FIG. 11 is a schematic representation of an image sensor mounted on a slider according to one embodiment suitable for practicing aspects of the present invention.

Suitably, the image sensor is mounted on a slider 130 of length L as shown in FIG. 11. The image sensor is moved from the left edge of the slider to the right edge in discrete steps 132, all of length δL. At each step 132, a digital image is taken of the scene or object 134 being modeled. Thus, assuming that the base is of length L, N+1 images are collected, each image sensor location being displaced δL units from the previous location. The image sensor moves on a slider (the base) and stops at points that are L/N (δL) apart to collect a digital image. After the image sensor has traversed the entire base, a collection of N images, offset by L/N from each other, is available for analysis. In most cases, an additional image is preferably taken from the center of the slider to be used for texture mapping.

The following assumptions are made in selected DLSS embodiments:
 1. There is no change in the y-value of a point as the image sensor moves along the base.
 2. The image sensor is parallel to the direction in which the image sensor slides.

These assumptions are made in order for the methods of parallax previously described to apply.

In the following description, it is shown how DLSS embodiments use these images and one of two candidate-point algorithms to generate 3d-spels. One of these algorithms assumes that the images are color images. The other assumes only that the image used for texture mapping is a color image.

3. Generating 3d-spels

Generating 3d-spels involves 2 steps. The first step is to find the same point in two of the images that were collected in the Data Capture Step. This means that, firstly, that pairs of pixels are found, one from image 1 and one from image n, that correspond to the same point in space. Such points are referred to as candidate 3d-spels. The candidate 3d-spels are accepted or rejected based on criteria described below. The second step is to calculate the coordinates for an accepted candidate 3d-spel by the methods previously described in the section on DLSS theory. As indicated in that section, calculating the (x,y,z) coordinates is straightforward provided a proper point is located. However, care is taken to ensure that the pixels in image 1 and image n do in fact represent the same point in space to ensure accurate 3D models.

Suitably, DLSS embodiments optionally use one of two methods to generate candidate 3d-spels, and to accept or reject them as actual 3d-spels. One method is based on color differential in the center image. This method is called Color Differential Analysis (CDA). The second method is based on edge detection in gray scale images and is called Gray-Scale Differential Analysis (GDA). A description is provided herein for each method.

Figure 12:
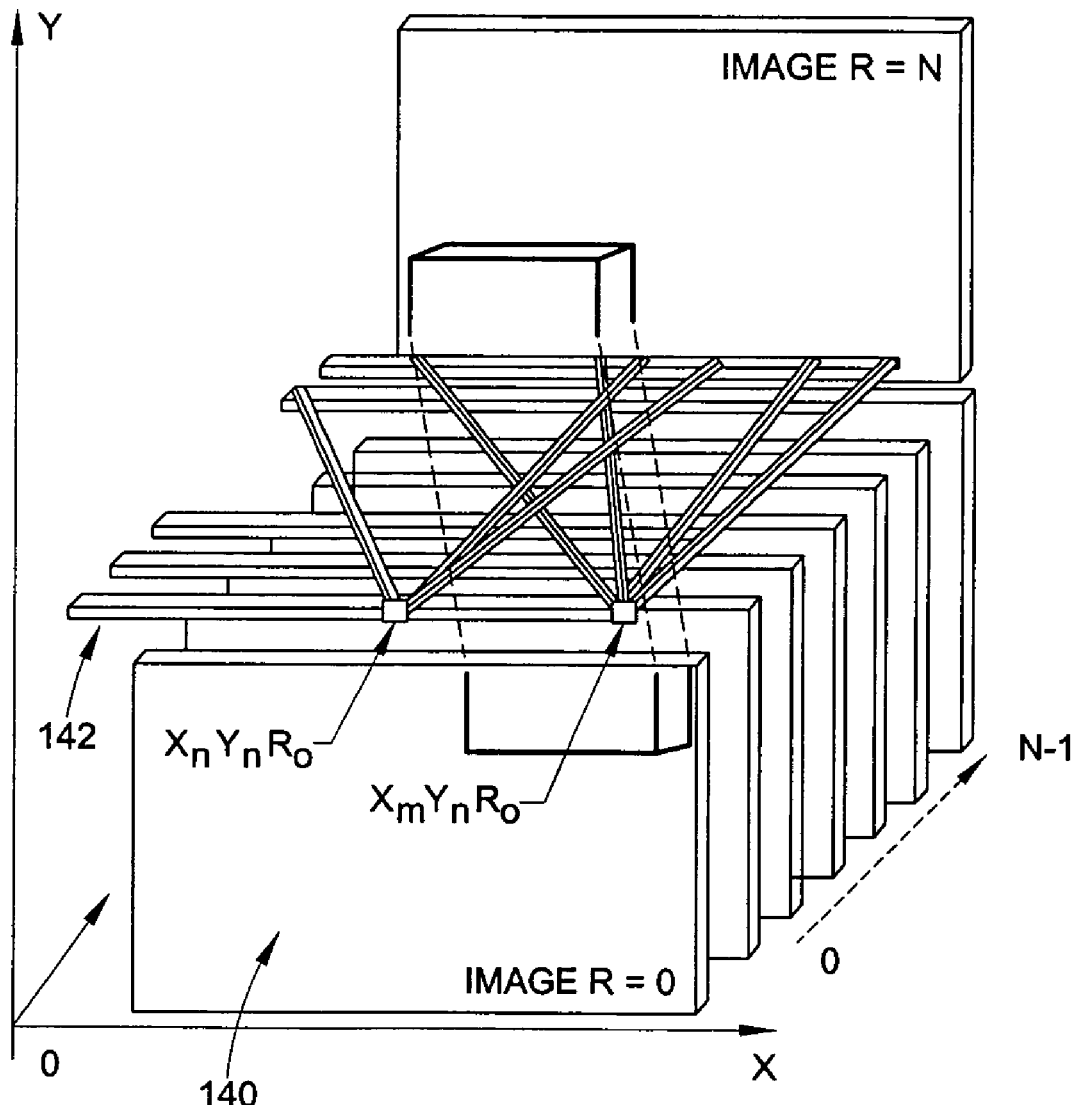
FIG. 12 illustrates an array of horizontal cross sections of color images obtained and processed in accordance with an exemplary embodiment of the present invention.

The first step in CDA is to form a three dimensional array from the sequence of images 140 previously generated as shown in FIG. 12. If the array is called E, then E(m,n,N) represents the color or intensity of the pixel in row m and column n of the Nth image.

Factors used for candidate 3D-spel location by color differential and DLSS methods are the cross sections 142 of the array of images. These cross sections 142 are simply y-slices of the array E that represent the points in the images located at a fixed y-value in space. It is now apparent why the assumption was made that there are no changes in y-values for an object as the image sensor moves along the slider during the data capture step. Since analysis is done on horizontal cross sections, it follows that the y-values should be consistent from image 0 to image N.

Figure 13:
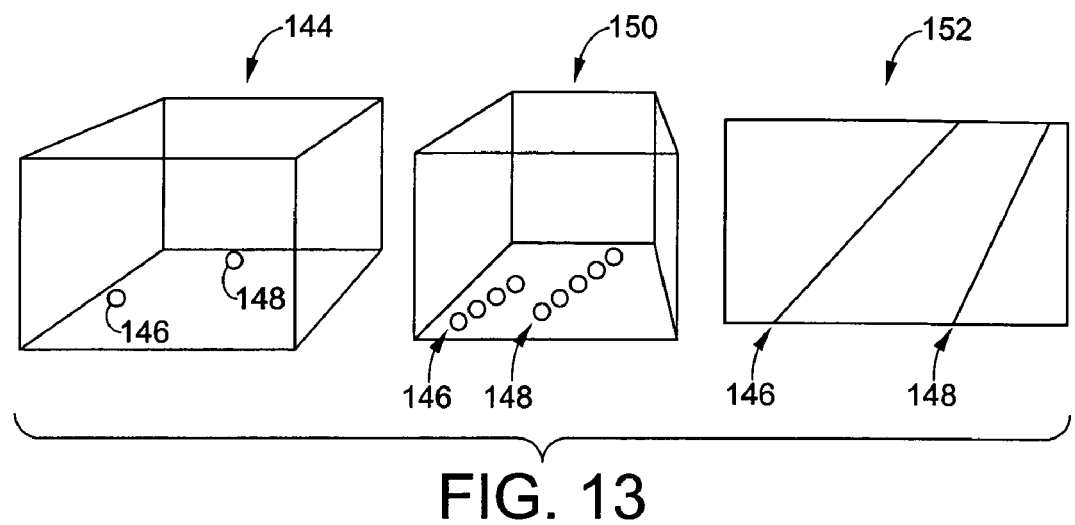
FIG. 13 shows a near point and a distant point of an object being modeled and the corresponding horizontal cross section images as per FIG. 12.

In FIG. 13, a first scene is shown 144 (left) that contains a near point 146 and a more distant point 148. In the center scene 150, the positions of the near and distant points 146, 148 are shown in each of the images 0, 1, 2, . . . , N. This figure maybe thought of as the array E described above. In the right scene 152, a horizontal cross-section of E as viewed from the top is shown. Since the near point is closer to the image sensor, it moves farther than the distant point as the image sensor moves from left to right.

Figure 14:
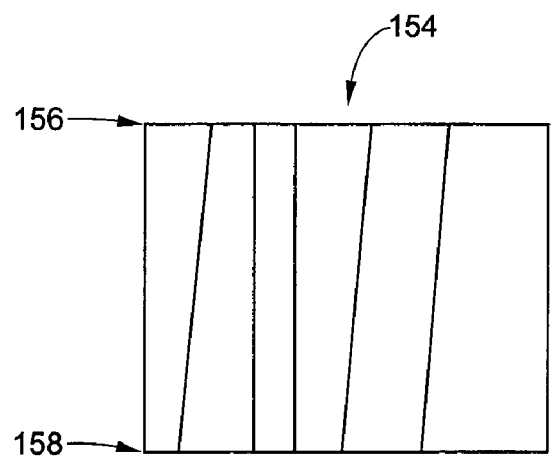
FIG. 14 shows a more complex horizontal cross section than shown in FIG. 13.

Most cross sections are not as simple as the one above. A typical cross section 154 may look more like that shown in FIG. 14. From this diagram, it is seen that it may be difficult to match pixels in the first image with those in the last image. For example, any of the near pixels in the back image 156 (image N) are candidates to match any of the distant pixels in the front image 158 (image 0). The same may be said of intermediate pixels as well.

Figure 15:
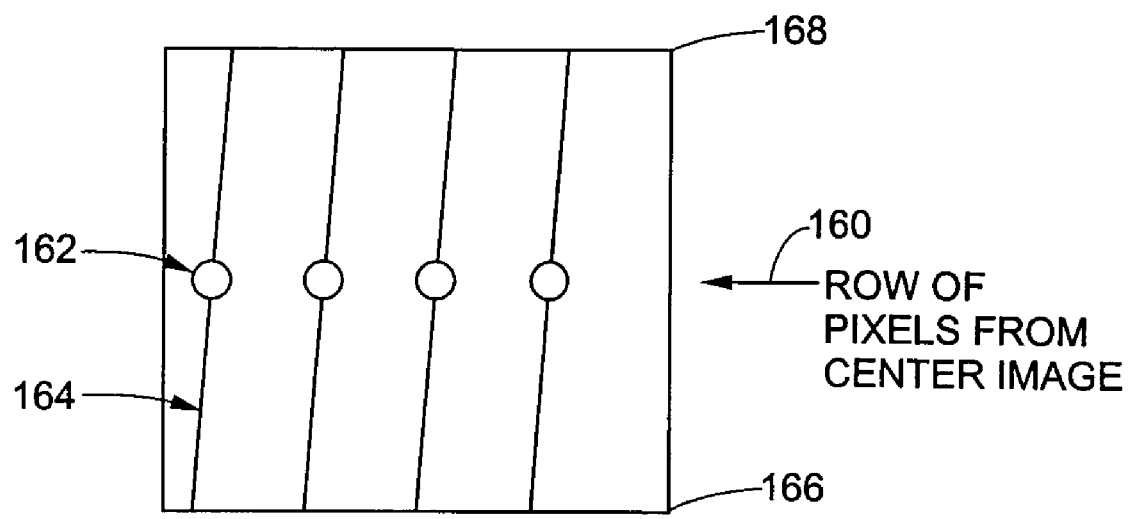
FIG. 15 shows a row of pixels from a center image of color images obtained and processed in accordance with an exemplary embodiment of the present invention.

CDA matches pixels by first looking for color differential in the aforementioned center image. By color differential, what is meant is an abrupt change in color moving across a set of pixels for a fixed y-value. In FIG. 15, the arrow 160 indicates the pixels corresponding to the center image in a fixed horizontal cross section. The circles 162 identify points where significant color differential is found as pixels are tested from left to right. These become the candidate points for 3d-spels.

Figure 16:
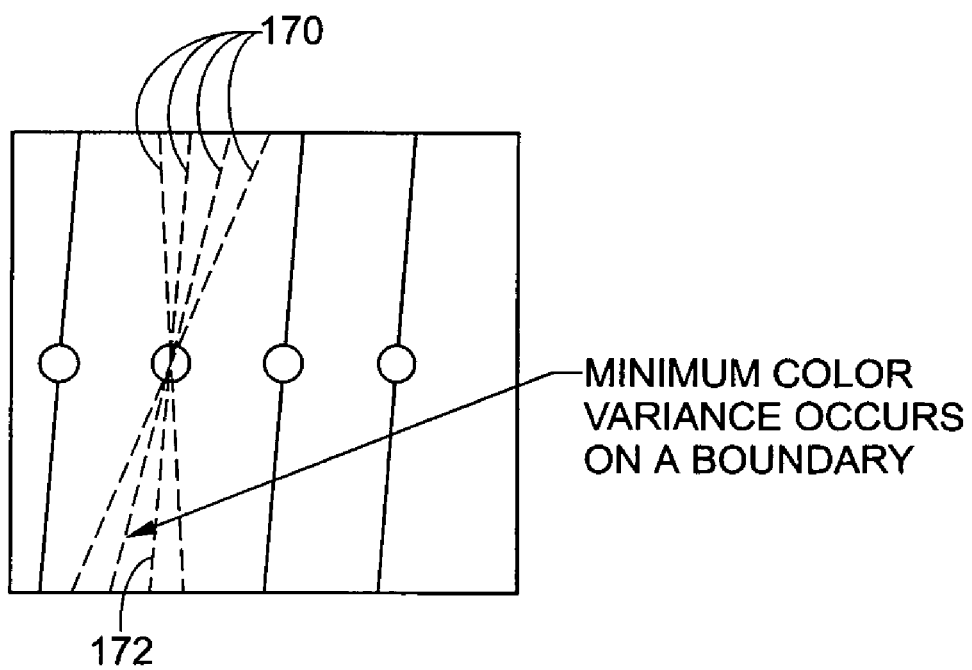
FIG. 16 shows a color variance boundary for the cross section of FIG. 15.

In the next step, CDA tests a family of lines 164 that pass through the points of color differential and that pass from the first image 166 to the last 168. Such a family 170 is illustrated in FIG. 16 with dashed lines.

For all such lines in the sequence, the dispersion or color variance of the pixel line is calculated. Suitably, this is simply the variation in the Red, Green, and Blue components of the pixels along this line. From the diagram, it is seen that the minimum variance will be on the line that represents a definite boundary 172 between objects of different color. In fact, if noise were not present (due to aliasing, inexact lighting or instrument error for example), the variance would be zero along such a line. For points not on the boundary line 172, the color variance will be non-zero.

In the CDA method, the line with the minimum color variance is tested. If the variance along the line with minimum color variance exceeds a pre-set threshold, the point is rejected and analysis proceeds to the next point. If this variance is below a certain threshold, the point is accepted as a 3d-spel. It is easily seen that, should a point be selected, the needed pixel offsets maybe found so that the (x,y,z) coordinates of the point may be calculated as previously described.

In addition to the CDA analysis described above, DLSS methods also identify candidate 3dspels by a second method that performs Gray Scale Differential Analysis on gray scale images. This method allows considerable performance gains over CDA by using simpler methods for locating candidate 3d-spels and for searching.

The image capture process takes grayscale images, rather than the color images used by CDA, as the image sensor slides along horizontally. These pictures are first passed through an edge detection algorithm. Edge detection takes the place of the analysis of rows of pixels in the center image. The result of the edge detection process is a second series of grayscale pictures. The intensity value in these images indicates the degree of "strength" or "hardness" of the edge, 0 for no edge, 255 for a large discontinuity for example.

Figure 17:
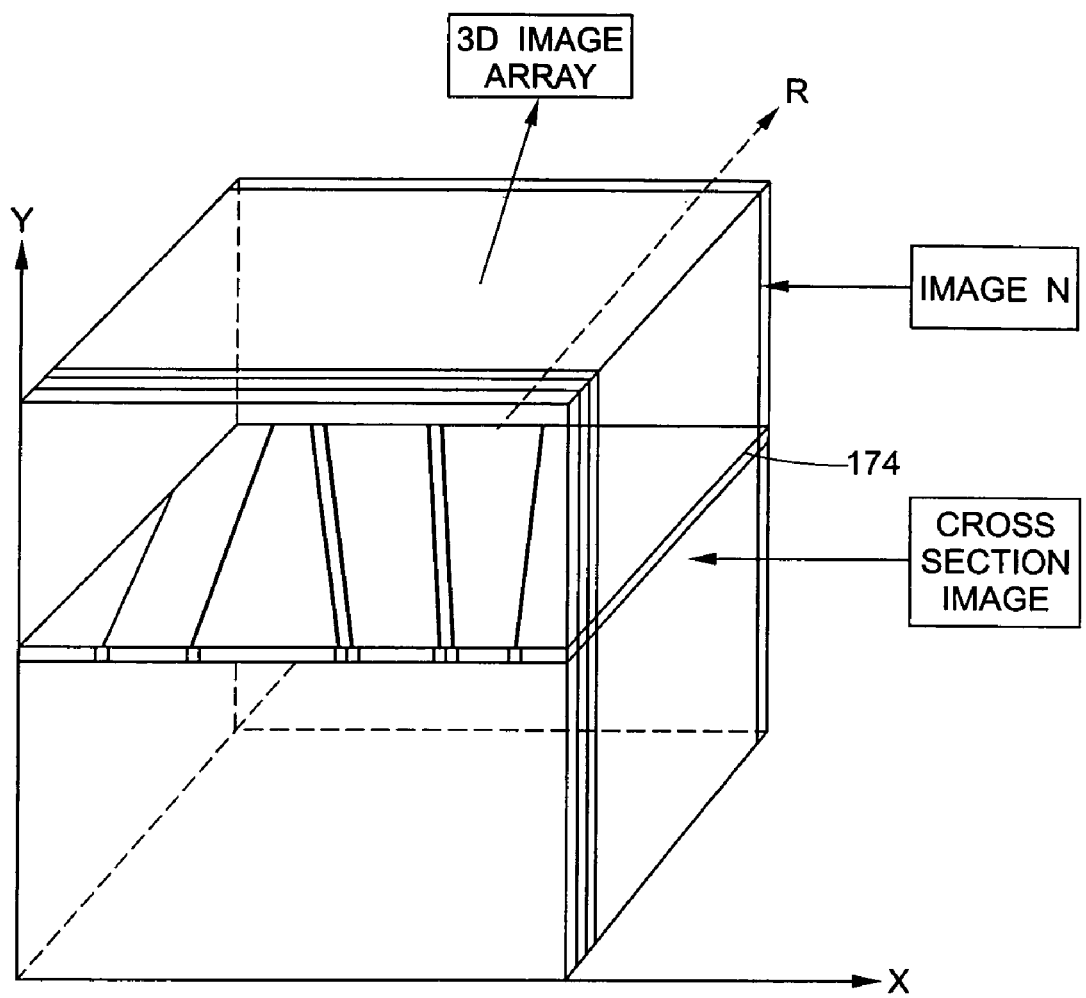
FIG. 17 illustrates an array of horizontal cross sections of gray scale images obtained and processed in accordance with an exemplary embodiment of the present invention.
Figure 18:
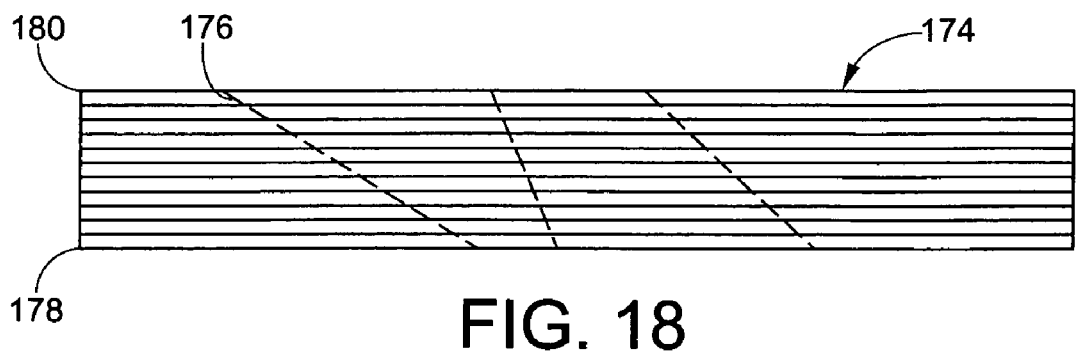
FIG. 18 is an exemplary horizontal cross section from FIG. 17.

The edge-detected images are arranged in a 3 dimensional array, just as the color images were in CDA, as shown in FIG. 17. Just as in CDA, horizontal cross sections 174 of this array are analyzed. As shown in FIG. 18, each cross section 174 is comprised of the same vertical row of edge strengths 176 from each of the images.

If it is possible to find a line of edges through a cross section, this implies the existence of a 3d-spel whose distance from the image sensor can be calculated by the previously described methods. Just as in CDA, the number of pixels the point travels from the first image 178 to the last 180 is readily available and determines the distance to the point.

To find 3d-spels, edges 176 are found that can be followed as they move through the images taken by adjacent image sensors. The process of finding all lines in all cross images is a highly computationally intensive task. In order to minimize the time required for these computations, the search algorithm tries to minimize the search time and reduce the search space. The primary means of minimizing line searching is to look in the bottom row 178 for a strong edge, and when one is found, try to find an edge in the top row 180 that matches it. If such a match is found, a candidate 3d-spel has been located and an attempt is made to follow the edge through the other images.

The degree of fit is measured by finding all pixels on the line 176 drawn between strong edges identified on the top and bottom images. If all pixels on the line exceed a certain threshold, and if they are all of roughly the same strength, then it is concluded that the line represents a point in 3-space. The (x,y,z) location of the point can then be determined from the image as described previously.

Figure 19:
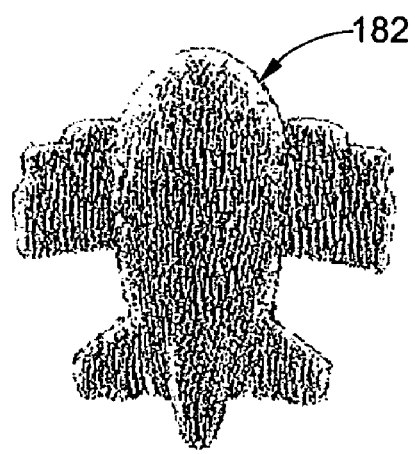
FIG. 19 shows a point cloud map of an exemplary object in accordance with aspects of the present invention.

With reference now to FIG. 19, when either the CDA process or the GDA process is finished, a point cloud 182 representing the 3D scene from a single image sensor location is available.

4. Point Registration

After the 3d-spels are calculated at all of the image sensor positions, They are merged into a single data set of 3d-spels with a common origin. This allows a point cloud generation of the entire space or object.

As previously described, one image sensor position may be obtained from another by:

(Case A) A known series of transformations that include translation or rotation; or (Case B) An unknown transformation.

If Case A applies, the inverse transformation is applied for each transformation in the known series. For example, suppose image sensor position B is obtained from an image sensor location by translating points by +10 units in the y-direction and rotating by 45 degrees about the y-axis. To register the points from image sensor B to the origin for the image sensor location, the transformations is applied that rotates by −45 degrees about the y-axis and translates by −10 in the y-direction.

If Case B applies, DLSS methods use routines that locate the same three points in each of camera A and camera B. Suitably, the same set of 3 points is located from each of the camera positions. Optionally, this step is separate from actual data capture from a given camera location. Using techniques previously summarized, DLSS embodiments proceed as follows:

a. Use the 3 points to construct a coordinate system for each camera; and b. Combine the data by converting one coordinate system to the other.

When point registration is complete, a 3D cloud of points is available for the entire space or object.

5. Triangulation and Mesh Generation

The next step in the DLSS preferred embodiment is to build a mesh, in particular a triangle mesh, from the set of 3d-spels gathered as described above. After the points are loaded in an appropriate data structure, they are filtered.

There are several reasons why the filtering step is preferable. First, the 3d-spel generating program generates a large number of points, often far too many to allow the triangulation procedure to work efficiently. In other technologies, such as laser technology, the number and approximate location of 3D points are controllable by the user. Optionally, in DLSS, all 3d-spels identified by CDA or GDA are included. In areas of high contrast or in areas replete with edges, many extra or superfluous points may be generated.

To improve the efficiency of the triangulation algorithm, the filtering algorithm seeks a single, representative point to replace points that are "too close" together. By "too close", it is meant that the points all lie with a sphere of radius R, where R is an input parameter to the triangulation subsystem. As R increases, more and more points are removed. Conversely, as R decreases, the number of points retained is increased. Clearly the size of R affects the final 3D resolution of the surface.

Another problem is that some 3D-spels may simply be noise. Due to the lighting, reflections, shadows, or other anomalies, points are generated that are not part of the surface. These points are preferably located and removed so that the surface is modeled correctly. Generally, noisy points are characterized by being "far away from any supporting points", i.e. they are very sparsely distributed within some sphere.

In a preferred embodiment, the construction of the triangle mesh itself is done by the method of Marching Cubes. Marching Cubes is a well-documented way of generating a triangle mesh from a set of points. The Method of Marching Cubes was developed by Lorensen and Cline in 1987 and has since been expanded to include tetrahedra and other solids. The input to this algorithm is the filtered set of points and a signed distance from the object being modeled to each of the points.

The notions of signed distance and a summary of the Marching cubes have been previously described. Together, these concepts allow the generation of triangles. The triangle generating process, like the 3d-spel generation process, is one of the most computationally expensive steps in the DLSS process.

To generate the triangle mesh, a set of cubes with controllable volume is superimposed over the set of 3d-spels. Controllable volume simply means that the length of one edge of the cube is an input parameter to the triangulation subsystem. It is easily seen that as the volumes of the cubes decreases, the surface is modeled more closely.

Triangles are chosen by the methods of Marching Cubes. Hence the cubes that have 3d-spels inside, as well close neighboring 3d-spels outside the cube, are identified. The triangles are formed according to the 16 possibilities specified by the Marching Cubes algorithm and illustrated in the diagrams of FIG. 10.

Figure 20:
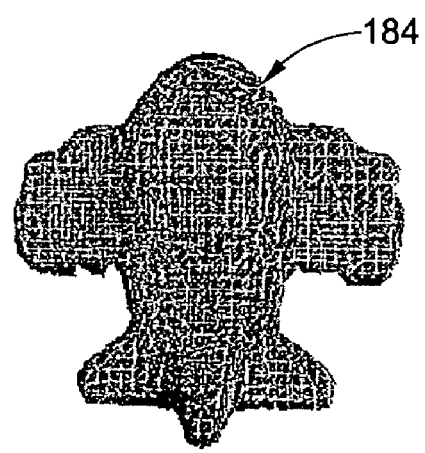
FIG. 20 shows a triangle mesh of an exemplary object in accordance with aspects of the present invention.

In addition to determining the vertices of the triangles, each triangle is oriented, i.e., the visible face of the triangle is determined. Using the signed distance and the vertices of the triangle, it is possible to determine a normal vector to each triangle that points away from the visible side of the triangle. The orientation step is performed since the texture of the surface is pasted on the visible side of the triangle. An incorrect orientation would result in a partially or completely inverted surface. When the triangulation process is finished, it is possible to display the object or space being modeled as a wire frame or wire mesh 184 as shown in FIG. 20.

6. Texture Mapping

The last step in the preferred DLSS method is to map texture to each of the triangles generated in the Triangulation process. The input to this step is a. The set of triangles from the triangulation step;

b. The images collected in the data acquisition that were designated for texture mapping; and c. An index indicating which image a triangle came from.

Since DLSS methods begin with pixels and ends with 3d-spels, it is possible to invert that process and find the pixel from which a 3d-spel was generated. Using the input data above, each of the 3d-spels which form the vertices of a triangle are converted to pixel coordinates. Furthermore, the image is known from which the triangle was generated.

Using these pixel coordinates, a triangle with 3d-spels as vertices can be matched with a triangular region in the image. Furthermore, it is known from which image the triangle was taken. Consequently the triangular region from that image corresponding to the given triangle can be extracted and pasted on.

Figure 21:
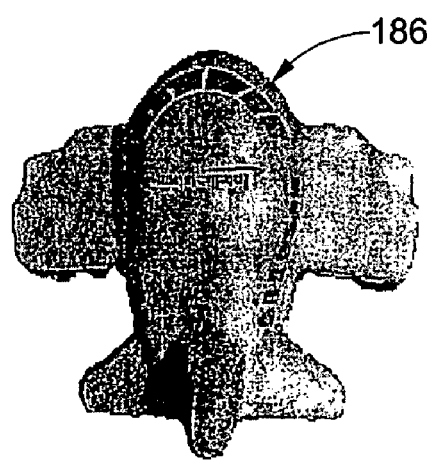
FIG. 21 shows a photo-realistic image of an exemplary object in accordance with aspects of the present invention.

After texture mapping is done, a complete, photo-realistic, spatially accurate model 186 of the space is available as shown in FIG. 21.

Alternative Configurations for DLSS Systems

Using the processes described in the previous sections, three exemplary embodiments of DLSS systems and/or methods are now disclosed. The first two primarily model objects or sets of objects, and the third is used primarily to model large spaces. A description of each embodiment is provided below.

Single Sensor Imager

Figure 22:
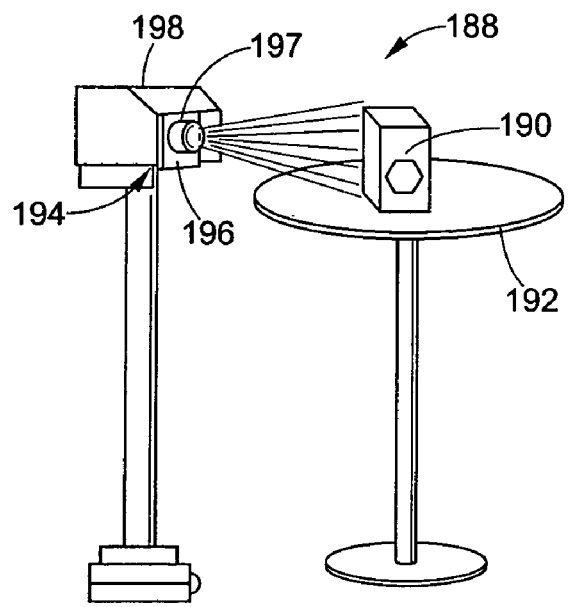
FIG. 22 shows a single-sensor imager having a camera movable on a track suitable for one embodiment of the present invention.

The Single Sensor Imager is appropriate for modeling lateral surfaces of an object or objects placed on a rotating table. A typical single sensor arrangement 188 is shown in FIG. 22.

To use the exemplary single image sensor object modeler, the user specifies three parameters:

1.) The first parameter, R, specifies how many views are made of the object 190, or equivalently, how many discrete stops the rotating table 192 makes. For example, the object space maybe viewed at 12 positions 194 that are 30 degrees apart or it maybe viewed at 8 positions that are 45 degrees apart.

2.) The second parameter, N, determines how many images (N+1) are taken at each rotation position of the rotating table. This input is the same quantity, N, described in the section for generating 3d-spels.

3.) The third parameter, B, specifies the length of the slider base 196 on which the camera 197 slides. This quantity controls the leftmost and rightmost positions of the image sensor on the slider and tells how far the image sensor moves between the first and the N+1th image.

A user may elect to project a grid of lines or points onto the object being modeled. This has the effect of introducing artificial edges and/or artificial points of color differential. Using these artificially generated edges, more candidate 3d-spels can be located on the object and, consequently, the model is more accurate.

When the user is satisfied with the setup, the following process is followed:

a. For each of the R image sensor positions, a set of N images is taken;
b. These images are processed and a set of 3d-spels is captured at each position;
c. The 3d-spels are combined into a 3D-model; and
d. The 3d-spels are triangulated and texture mapped so that a photo-realistic 3D model is available of the object.

As indicated above, the exemplary single image sensor object modeler is suited to providing lateral views of an object. Due to the fixed position of the image sensor, it is possible that the top or bottom of an object will be insufficiently modeled. In the next section, a DLSS setup is described that can model an object from multiple image sensor positions.

Multi-Sensor Imager

The Multi-Sensor Imager is an extension of the single image sensor modeler. In fact, each individual image sensor in the multi-sensor imager is simply an instance of a single sensor imager 198. The purpose of adding additional image sensors is to capture data from regions such as the top or bottom of the object being modeled.

Figure 23:
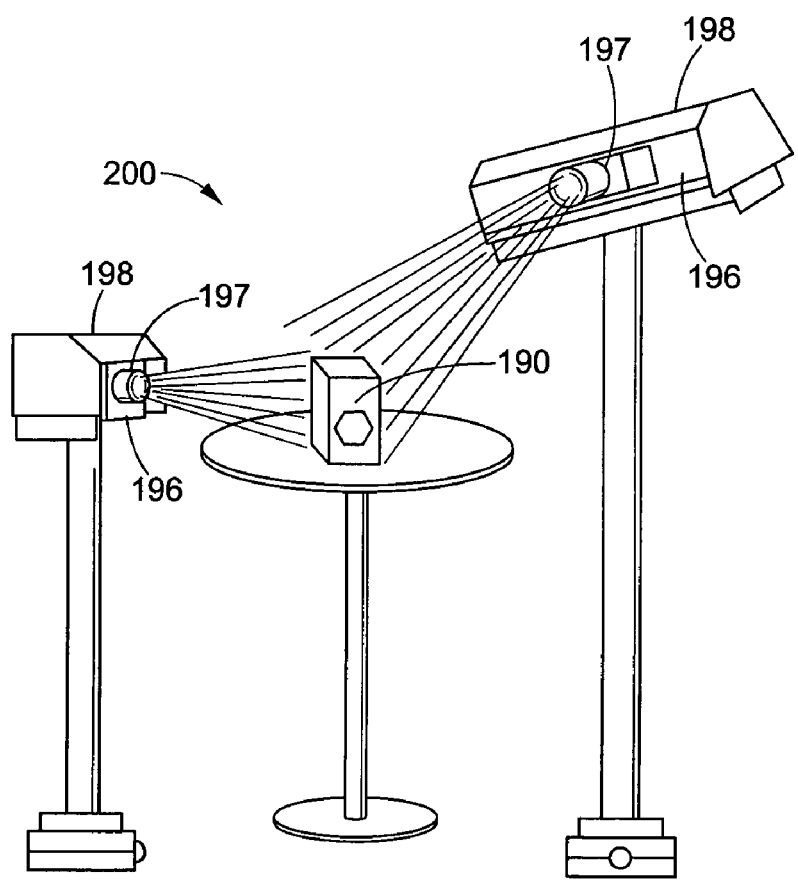
FIG. 23 shows a multi-sensor imager suitable for another embodiment of the present invention.

An exemplary two-image sensor setup 200 is shown in FIG. 23. The second image sensor is used to capture data from the top of the object. It is noted, however, that the methodology is not restricted to two image sensors. As many image sensors may be used as necessary.

To use the multi-sensor system, the user first registers the various image sensor positions, i.e., the user establishes an origin that is common to the data collected from each image sensor. This is done by locating the same three points in each sensor and applying the coordinate transformations previously described.

After the coordinate systems are registered, in the exemplary embodiment, the user specifies the parameters R, N, and B described above. These parameters may vary for each image sensor or they may all be assigned common values. As in the single image sensor case, the user may elect to project a grid on the object to introduce artificial edges and points of color differential.

When the user is satisfied with the set up,
1. The 3d-spels are collected from each image sensor and from each image sensor position;
2. The points are registered; and
3. The points are triangulated and texture mapped to form the photo-realistic models.

This model is appropriate for modeling objects that are in the middle of or surrounded by image sensors located at various positions. It is an improvement over the single image sensor method since it allows the possibility of collecting additional 3d-spels to model the top or bottom of an object.

Pan and Tilt Imager

Figure 24:
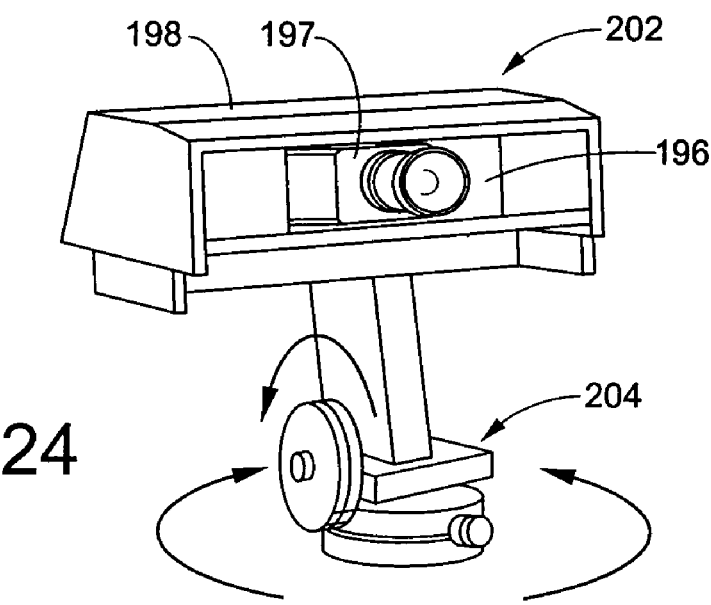
FIG. 24 shows a pan-and-tilt imager suitable for yet another embodiment of the present invention.

With reference to FIG. 24, an exemplary Pan and Tilt Imager 202 is built by placing an image sensor 198 on a platform 204 that can pan (rotate in the horizontal plane about the y-axis) and/or tilt (rotate up and down in the vertical plane about the x-axis). The initial position of the modeler is not important, however it is generally considered as being rotated by zero degrees on each axis.

The pan and tilt imager method distinguishes itself from the other two methods in several ways:

1. The focal point of the image sensor lens is considered to be the origin of the scene being modeled.
2. The system is more appropriate for modeling a scene, for example the interior of a room or the interior of some other enclosed space.

To use the exemplary pan and tilt modeler, the user specifies which subset of the space is going to be mapped. Due to the varying distances to the boundaries of the space, the field of view may change. For example, if the image sensor is in its initial position, the distance to the enclosure boundaries and the size of the image sensor lens will determine the field of view. If the image sensor is then tilted up or down, or rotated left or right, the distance to the boundary may change. If this distance increases, the field of view becomes larger. If the distance decreases, the field of view becomes smaller.

To accommodate the change in field of view, the DLSS system automatically determines a sequence of pans and tilts that will cover the entire area to be modeled. The sequence that generates the model is given here:

1. The user selects the region to be modeled from a live view or previously taken digital images.
2. The DLSS system calculates a sequence of pans and tilts—$(p_i, t_i)$ i=1, 2, . . . M that ensure coverage of the space.
3. For each pair $(p_i, t_i)$, 3d-spels are collected by the previously described methods.
4. The sets of 3d-spels are combined by the method of Inverse Transformation.
5. Triangulation and Texture mapping generate the final 3d, photo-realistic model as shown in FIG. 21.

Figure 25:
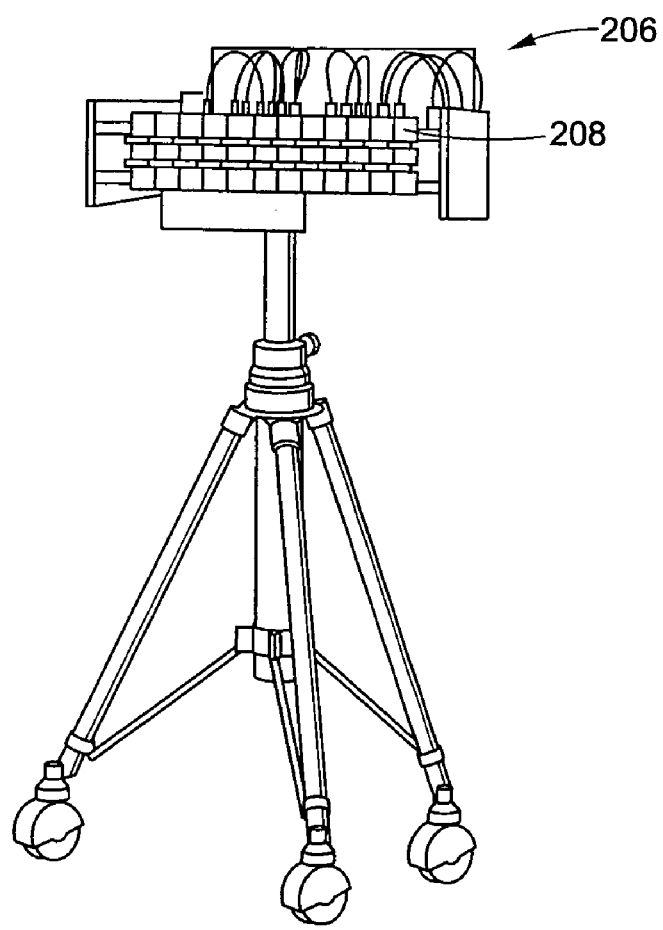
FIG. 25 shows an alternate imager having an array of fixed sensors suitable for yet another embodiment of the present invention.

FIG. 25 shows an alternate imager 206 for the imager 198 of FIG. 22. The alternate image 206 has an array of fixed sensors 208 that replace the movable camera 197 and the slider 196. The fixed sensors 208 can advantageously be configured to take a plurality of images at fixed offsets simultaneously, without any delay as incurred by having a camera moving on a slider base between successive images. The distance between the end sensors of the array of fixed sensors corresponds to the length of the slider base 196 of the sensor having a movable camera.

Viewing and Imaging Tool for DLSS 3D Models

The preferred DLSS embodiments model objects or scenes (spaces) and generate spatially accurate, photo-realistic 3D models of the objects or spaces. It is thus advantageous to have a viewing tool for examining and manipulating the generated 3D models.

Figure 26:
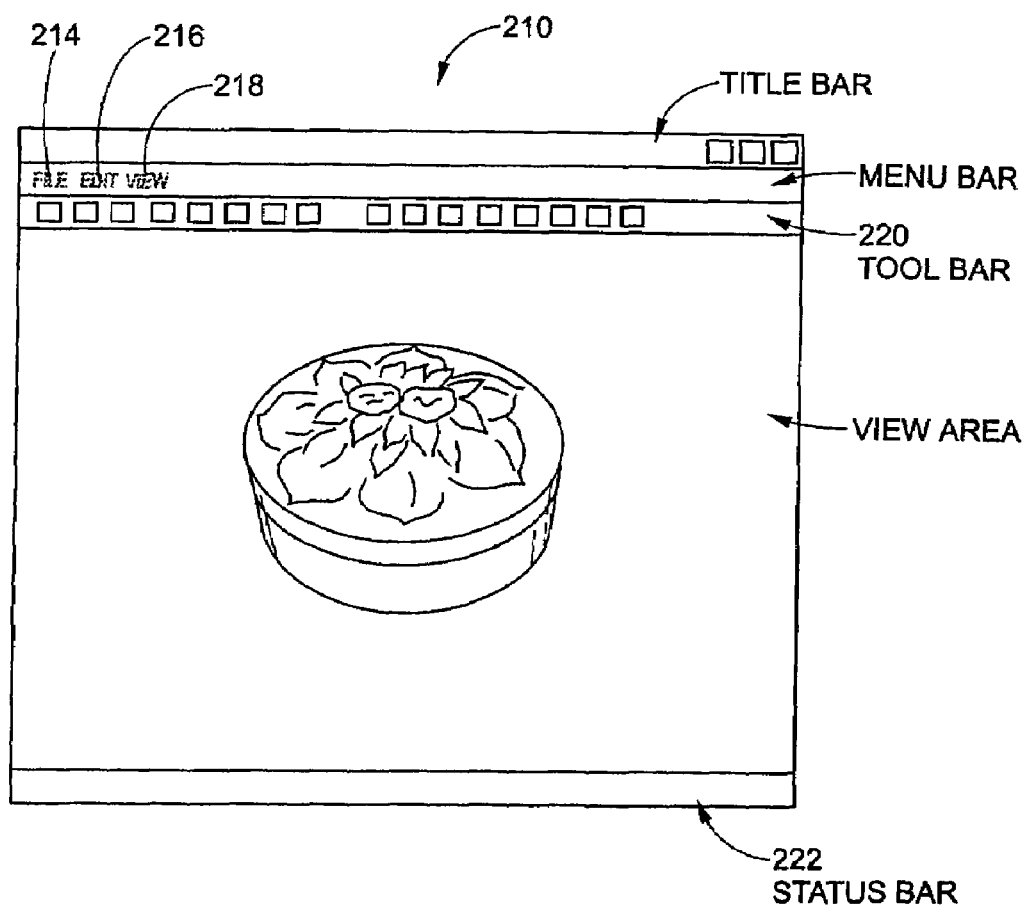
FIG. 26 shows a viewing and imaging tool window according to one embodiment suitable for practicing aspects of the present invention.

FIG. 26 shows an exemplary viewing and imaging tool window 210 suitable for use with DLSS 3D models. The viewing and imaging tool displays the generated 3D point cloud data or 3D textured models 212 while, at the same time, providing navigation tools that enable viewing the models at every possible three-dimensional angle. The tool can be used for inspecting, measuring and ensuring the quality of textured 3D models before exporting the models into other applications.

The viewing tool has file menu selections 214 for opening 3D models, opening 3D point clouds, importing other 3D model types, exporting to other 3D model types, and exiting the viewer. Edit menu selections 216 are provided for copying selected sets of points, cutting selected sets of points, pasting sets of points from previous copy or cut operations, and for deleting sets of points. A selection is also provided for setting user preferences. A view menu 218 provides selections for setting a navigation mode, for adjusting the field of view, for centering the viewed model in the view area, and for selecting various viewpoints. Provision is also made for setting the view area to a full screen mode, for displaying in either wire-frame or texture-mapped modes, for showing the X, Y and Z axes, or for showing the X, Y and Z planes in the view area. Optional tool bars 220 and status bars 222 are also provided.

While this overview of the viewing and imaging tool provides a basic description of the tool, it is not an exhaustive description, and additional features and menus may be provided with the tool as are well known in the art.

Navigation Modes

The exemplary viewing and imaging tool provides four ways to view 3D models. A fly mode provides flexible navigation in the view area. This mode is similar to the interactive modes used on many interactive video game systems. A spin mode, the default mode, permits rotating the 3D model 212 in the view area on each of its axes so the model can be viewed from any angle. A pan mode allows the user to pan around the 3D model 212 in the view area. A zoom mode provides for zooming in towards the 3D model 212 or out from the 3D model 212. While the aforementioned modes provide the essential requirements for viewing 3D models, the viewing and imaging tool is not limited in scope to these modes and other modes may be provided.

While particular embodiments have been described, alternatives, modifications, variations, improvements, and substantial equivalents that are, or may be presently unforeseen, may arise to applicants or others skilled in the art. Accordingly, the appended claims as filed, and as they may be amended, are intended to embrace all such alternatives, modifications, variations, improvements and substantial equivalents.

What is claimed is:

1. A discrete linear space sampling method for generating digital 3D models comprising:
   acquiring a plurality of digital images of a subject from a respective plurality of image sensor positions near to an image sensor location;
   identifying candidate 3d-spels from the acquired digital images, each 3d-spel being an image pixel corresponding to a common point on said subject, and each 3d-spel corresponding to a pair of acquired pixels, the first acquired pixel of the pair of acquired pixels being selected from one of the plurality of acquired images and the second acquired pixel of the pair of acquired pixels being selected from one of the remaining of the plurality of acquired images;
   rejecting candidate 3d-spels based on a differential analysis of the candidate 3d-spels, the remaining 3d-spels forming a set of accepted 3d-spels; and,
   calculating 3D coordinates for each accepted 3d-spel, thereby forming a point-cloud of the subject.

2. The method as set forth in claim 1, further including projecting a predetermined grid or a predetermined set of lines onto the subject when acquiring the plurality of digital images for introducing artificial edges and/or artificial points of color differential on the subject.

3. The method as set forth in claim 1, wherein the image sensor is a camera movable along a linear axis.

4. The method as set forth in claim 1, wherein the image sensor is a fixed linear array of sensors.

5. The method as set forth in claim 1, wherein the subject is at least one object.

6. The method as set forth in claim 1, wherein the subject is a scene or space.

7. A discrete linear space sampling method for generating digital 3D models comprising:
   acquiring a plurality of digital images of a subject from a respective plurality of image sensor positions near to an image sensor location;
   identifying candidate 3d-spels, each 3d-spel being an image pixel corresponding to a common point on said subject;
   rejecting candidate 3d-spels based on a differential analysis of the candidate 3d-spels, the remaining 3d-spels forming a set of accented 3d-spels;
   calculating 3D coordinates for each accepted 3d-spel, thereby forming a point-cloud of the subject; and,
   organizing said acquired digital images into a three-dimensional array of pixels having a plurality of rows and a plurality of columns, each row and column corresponding to a two-dimensional pixel position for each of said images, wherein each image occupies a respective position in the third dimension of the array, and wherein each position in the three-dimensional array contains at least one pixel value for the respective pixel position.

8. The method as set forth in claim 7, wherein the rejecting is based on a differential analysis of the at least one pixel value for the respective pixel position corresponding to each candidate 3d-spel.

9. The method as set forth in claim 8, further comprising:
   generating a geometric mesh of the scene or object based on the accepted 3d-spels, including determining a visible face of each geometric entity comprising the geometric mesh;
   mapping a texture to the geometric mesh including determining which of the plurality of acquired digital images each geometric entity corresponds to and determining for each geometric entity a selected geometric region of the corresponding digital image; and,
   pasting the texture onto the geometric mesh including pasting digital image data from each selected geometric region onto the visible face of the geometric entity of the geometric mesh.

10. The method as set forth in claim 9, wherein the geometric mesh is a triangular mesh and the geometric entity is a triangle.

11. The method as set forth in claim 8, further including filtering the accepted set of 3d-spels comprising:
   replacing a plurality of accepted 3d-spels within a sphere of a first predetermined spherical radius with a single representative 3d-spel; and,
   removing accepted 3d-spels determined to be noise and/or determined to be sparsely populated within a sphere of a second predetermined spherical radius.

12. A discrete linear space sampling method for generating digital 3D models comprising:
   acquiring a plurality of digital images of a subject from a respective plurality of image sensor positions near to an image sensor location;
   identifying candidate 3d-spels, each 3d-spel being an image pixel corresponding to a common point on said subject;
   rejecting candidate 3d-spels based on a differential analysis of the candidate 3d-spels, the remaining 3d-spels forming a set of accepted 3d-spels;
   calculating 3D coordinates for each accepted 3d-spel, thereby forming a point-cloud of the subject;
   repeating the acquiring, identifying, rejecting and calculating for one or more additional image sensor locations with respect to said subject, thereby providing a plurality of sets of digital images and a plurality of sets of 3d-spels; and, registering the 3d-spels of the plurality of sets of 3d-spels, thereby creating a merged set of 3d-spels having a common origin.

13. The method as set forth in claim 12, further comprising:
organizing said acquired plurality of sets of digital images into a plurality of sets of three-dimensional arrays of pixels, each array having a plurality of rows and a plurality of columns, each row and column corresponding to a two-dimensional pixel position for each of said images, wherein each image occupies a respective position in the third dimension of the array, and wherein each position in the three-dimensional array contains at least one pixel value for the respective pixel position.

14. The method as set forth in claim 13, wherein the rejecting is based on a differential analysis of the at least one pixel value for the respective pixel position corresponding to each candidate 3d-spel.

15. The method as set forth in claim 14, further comprising:
generating a geometric mesh of the scene or object based on the merged set of accepted 3d-spels, including determining a visible face of each geometric entity comprising the geometric mesh;
mapping a texture to the geometric mesh including determining which of the plurality of acquired digital images each geometric entity corresponds to and determining for each geometric entity a selected geometric region of the corresponding digital image; and,
pasting the texture onto the geometric mesh including pasting digital image data from each selected geometric region onto the visible face of the geometric entity of the geometric mesh.

16. The method as set forth in claim 15, wherein the geometric mesh is a triangular mesh and the geometric entity is a triangle.

17. The method as set forth in claim 14, further including filtering the merged set of 3d-spels comprising:
replacing a plurality of 3d-spels of the merged set of 3d-spels within a sphere of a first predetermined spherical radius with a single representative 3d-spel; and,
removing 3d-spels of the merged set of 3d-spels determined to be noise and/or determined to be sparsely populated within a sphere of a second predetermined spherical radius.

18. The method as set forth in claim 12, wherein the registering comprises applying known transformations to the image sensor locations.

19. The method as set forth in claim 18, wherein the applying known transformations includes determining homogeneous coordinates and applying affine transformations.

20. The method as set forth in claim 12, wherein the registering comprises applying unknown transformations to the plurality of image sensor coordinate systems.

21. The method as set forth in claim 20, wherein the applying unknown transformations includes:
determining a first set of three points from a first image sensor location and a second set of three matching points from a second image sensor location;
aligning respective image sensor coordinate systems according to the first and second sets of three matching points; and,
repeating the determining and aligning steps at remaining image sensor locations.

22. The method as set forth in claim 12, wherein the additional image sensor locations include additional image sensors.

23. The method as set forth in claim 12, further including rotating the subject.

24. A system for generating digital 3D models comprising:
means for acquiring a plurality of digital images of a subject from a respective plurality of image sensor positions near to an image sensor location;
means for identifying candidate 3d-spels from the acquired digital images, each 3d-spel being an image pixel corresponding to a common point on said subject, and each 3d-spel corresponding to a pair of acquired pixels, the first acquired pixel of the pair of acquired pixels being selected from one of the plurality of acquired images and the second acquired pixel of the pair of acquired pixels being selected from one of the remaining of the plurality of acquired images;
means for rejecting candidate 3d-spels based on a differential analysis of the candidate 3d-spels, the remaining 3d-spels forming a set of 3d-spels; and,
means for calculating 3D coordinates for each accepted 3d-spel, thereby forming a point-cloud of the subject.

25. The system as set forth in claim 24, further including means for projecting a predetermined grid or a predetermined set of lines onto the subject when acquiring the plurality of digital images for introducing artificial edges and/or artificial points of color differential on the subject.

26. The system as set forth in claim 24, wherein the image sensor is a camera movable along a linear axis.

27. The system as set forth in claim 24, wherein the image sensor is a fixed linear array of sensors.

28. The system as set forth in claim 24, wherein the subject is at least one object.

29. The system as set forth in claim 24, wherein the subject is a scene or space.

30. A system generating digital 3D models comprising:
means for acquiring a plurality of digital images of a subject from a respective plurality of image sensor positions near to an image sensor location;
means for identifying candidate 3d-spels, each 3d-spel being an image pixel corresponding to a common point on said subject;
means for rejecting candidate 3d-spels based on a differential analysis of the candidate 3d-spels, the remaining 3d-spels forming a set of accented 3d-spels;
means for calculating 3D coordinates for each accented 3d-spel, thereby forming a point-cloud of the subject; and,
means for organizing said acquired digital images into a three-dimensional array of pixels having a plurality of rows and a plurality of columns, each row and column corresponding to a two-dimensional pixel position for each of said images, wherein each image occupies a respective position in the third dimension of the array, and wherein each position in the three-dimensional array contains at least one pixel value for the respective pixel position.

31. The system as set forth in claim 30, wherein the rejecting is based on a differential analysis of the at least one pixel value for the respective pixel position corresponding to each candidate 3d-spel.

32. The system as set forth in claim 31, further comprising:
means for generating a geometric mesh of the scene or object based on the accepted 3d-spels, including means for determining a visible face of each geometric entity comprising the geometric mesh;

means for mapping a texture to the geometric mesh including determining which of the plurality of acquired digital images each geometric entity corresponds to and means for determining for each geometric entity a selected geometric region of the corresponding digital image; and, means for pasting the texture onto the geometric mesh including pasting digital image data from each selected geometric region onto the visible face of the geometric entity of the geometric mesh.

33. The system as set forth in claim 32, wherein the geometric mesh is a triangular mesh and the geometric entity is a triangle.

34. The system as set forth in claim 31, further including means for filtering the accepted set of 3d-spels comprising:

means for replacing a plurality of accepted 3d-spels within a sphere of a first predetermined spherical radius with a single representative 3d-spel; and, means for removing accepted 3d-spels determined to be noise and/or determined to be sparsely populated within a sphere of a second predetermined spherical radius.

35. A system generating digital 3D models comprising:

means for acquiring a plurality of digital images of a subject from a respective plurality of image sensor positions near to an image sensor location;

means for identifying candidate 3d-spels, each 3d-spel being an image pixel corresponding to a common point on said subject;

means for rejecting candidate 3d-spels based on a differential analysis of the candidate 3d-spels, the remaining 3d-spels forming a set of accented 3d-spels;

means for calculating 3D coordinates for each accented 3d-spel, thereby forming a point-cloud of the subject;

means for repeating the acquiring, identifying, rejecting and calculating for one or more additional image sensor locations, thereby providing a plurality of sets of digital images and a plurality of sets of 3d-spels; and, means for registering the 3d-spels of the plurality of sets of 3d-spels, thereby creating a merged set of 3d-spels having a common origin.

36. The system as set forth in claim 35, further comprising:

means for organizing said acquired plurality of sets of digital images into a plurality of sets of three-dimensional arrays of pixels, each array having a plurality of rows and a plurality of columns, each row and column corresponding to a two-dimensional pixel position for each of said images, wherein each image occupies a respective position in the third dimension of the array, and wherein each position in the three-dimensional array contains at least one pixel value for the respective pixel position.

37. The system as set forth in claim 36, wherein the rejecting is based on a differential analysis of the at least one pixel value for the respective pixel position corresponding to each candidate 3d-spel.

38. The system as set forth in claim 37, further comprising:

means for generating a geometric mesh of the scene or object based on the merged set of accepted 3d-spels, including means for determining a visible face of each geometric entity comprising the geometric mesh;

means for mapping a texture to the geometric mesh including means for determining which of the plurality of acquired digital images each geometric entity corresponds to and determining for each geometric entity a selected geometric region of the corresponding digital image; and, means for pasting the texture onto the geometric mesh including pasting digital image data from each selected geometric region onto the visible face of the geometric entity of the geometric mesh.

39. The system as set forth in claim 38, wherein the geometric mesh is a triangular mesh and the geometric entity is a triangle.

40. The system as set forth in claim 37, further including means for filtering the merged set of 3d-spels comprising:

means for replacing a plurality of 3d-spels of the merged set of 3d-spels within a sphere of a first predetermined spherical radius with a single representative 3d-spel; and, means for removing 3d-spels of the merged set of 3d-spels determined to be noise and/or determined to be sparsely populated within a sphere of a second predetermined spherical radius.

41. The system as set forth in claim 35, wherein the registering means comprises means for applying known transformations to the image sensor locations.

42. The system as set forth in claim 41, wherein the applying known transformations includes determining homogeneous coordinates and applying affine transformations.

43. The system as set forth in claim 35, wherein the registering means comprises means for applying unknown transformations to the plurality of image sensor coordinate systems.

44. The system as set forth in claim 43, wherein the means for applying unknown transformations includes:

means for determining a first set of three points from a first image sensor location and a second set of three matching points from a second image sensor location;

means for aligning respective image sensor coordinate systems according to the first and second sets of three matching points; and, means for repeating the determining and aligning steps at remaining image sensor locations.

45. The system as set forth in claim 35, further including a plurality of image sensors, each image sensor configured to acquire a respective plurality of digital images of the subject from a respective image sensor location, each image of the respective plurality of digital images acquired from a position offset from the remaining positions near the respective sensor location.

46. The system as set forth in claim 35, further including a means for rotating the subject.

* * * * *